United States Patent
Kim et al.

(10) Patent No.: US 7,661,122 B2
(45) Date of Patent: Feb. 9, 2010

(54) METHOD AND DEVICE FOR INITIALIZING CABLE CARD AND CHANNEL LIST USING RESET MENU ON OSD SCREEN

(75) Inventors: Soo-hyang Kim, Suwon-si (KR); Chul-jun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 643 days.

(21) Appl. No.: 11/195,797

(22) Filed: Aug. 3, 2005

(65) Prior Publication Data

US 2006/0048181 A1    Mar. 2, 2006

(30) Foreign Application Priority Data

Aug. 26, 2004   (KR)   .............. 10-2004-0067366

(51) Int. Cl.
 *H04N 7/16*   (2006.01)
(52) U.S. Cl. .................. 725/140; 725/152
(58) Field of Classification Search ............. None
See application file for complete search history.

(56) References Cited

U.S. PATENT DOCUMENTS

| | | | |
|---|---|---|---|
| 5,835,864 A * | 11/1998 | Diehl et al. ............ | 725/140 |
| 5,898,869 A | 4/1999 | Anderson | |
| 5,917,481 A * | 6/1999 | Rzeszewski et al. ...... | 715/721 |
| 6,052,381 A * | 4/2000 | Henriksson et al. ...... | 370/465 |
| 6,452,616 B1 * | 9/2002 | De Vito et al. .......... | 715/825 |
| 6,650,347 B1 * | 11/2003 | Nulu et al. .............. | 715/853 |
| 7,050,830 B2 * | 5/2006 | Fouque et al. ........... | 455/558 |
| 7,069,578 B1 * | 6/2006 | Prus et al. ............... | 725/132 |

FOREIGN PATENT DOCUMENTS

| | | |
|---|---|---|
| CN | 1437111 A | 8/2003 |
| KR | 1996-020408 A | 6/1996 |
| KR | 1997-009255 A | 2/1997 |
| KR | 1999-041607 A | 6/1999 |
| KR | 2000-0065327 A | 11/2000 |
| KR | 2003-0072533 A | 9/2003 |

* cited by examiner

*Primary Examiner*—John W Miller
*Assistant Examiner*—Chris Parry
(74) *Attorney, Agent, or Firm*—Sughrue Mion, PLLC

(57) ABSTRACT

An apparatus and method are provided for initializing a cable card and a channel list using a reset menu on an OSD screen. The initialization of a cable card is achieved by receiving a cable card reset request through the reset menu on the OSD screen; and according to the cable card reset request, performing an initialization of the cable card. If a malfunction occurs in equipment, a user can initialize the cable card by selecting the reset menu on the OSD menu screen.

14 Claims, 4 Drawing Sheets

METHOD AND DEVICE FOR INITIALIZING CABLE CARD AND CHANNEL LIST USING RESET MENU ON OSD SCREEN

CROSS-REFERENCE TO RELATED APPLICATIONS

This application claims benefit under 35 U.S.C. § 119 from Korean Patent Application No. 10-2004-0067366 filed on Aug. 26, 2004 in the Korean Intellectual Property Office, the entire content of which is incorporated herein by reference.

BACKGROUND OF THE INVENTION

1. Field of the Invention

Apparatuses and methods consistent with the present invention relate to initializing a cable card and a channel list, and more particularly, to initializing a cable card and a channel list using a reset menu on an OSD (On-Screen Display) screen.

2. Description of the Related Art

Ever since TV waves were officially emitted, TVs for receiving those TV waves have prevailed more than any kind of media device and a great number of TV broadcast contents have been produced.

The important role of the TV associated with delivering knowledge and sharing information should not ever be overlooked. However, producing and sending broadcasting programs requires building a lot of facilities and financing capital investment. These requirements were often major obstacles to meet consumers' diverse and ever-increasing demands.

As an attempt to solve the above problem, some cable TV stations produced specialized programs with lower budgets than what the existing sky wave TV stations usually spent. To watch those cable TV broadcasting programs, customers needed a separate device called a STB (Set-Top Box), in addition to an antenna.

The first-generation set-top boxes helped the customers watch a variety of cable TV channels although they were televised in one-direction only. In contrast, digital set-top boxes, known as second-generation set-top boxes, found their own territory, independent from other home appliances, escaping the traditional role as an object to be placed on a TV set. Diverse functions and additional services were provided through the digital set-top boxes, which are specialized computers for enabling the viewers to transmit and receive data over the Internet, and having a web browser and a protocol like TCP/IP.

A cable card is a key element of an open cable that cable TVs adopted as a technical standard. More specifically, the cable card, which is inserted into the digital TV set-top box, is a chip containing a subscriber's information. Unlike the traditional set-top box, the cable card is not actually incorporated into the set-top box but is a separate device.

According to the recently released Federal Communications Commission (FCC) regulations, every cable company in the United States has to provide a cable card to every digital cable subscriber. By installing the cable card, a subscriber does not need purchase or rent a digital set-top box, but is capable of connecting digital products such as digital TVs, recorders and computers directly to the cable.

When the cable card is inserted into a digital TV, provided that the cable card can be detached from the digital TV, a designated internal module of the TV initializes bidirectional communication with the cable card and determines whether the cable card and the digital TV are compatible with each other.

If it turns out that the cable card and the digital TV are compatible, the device performs normal operations, but if not, a malfunction occurs in the device.

In most cases when the cable card and the digital TV are not compatible with each other, and the device malfunctions, it is because the cable card has a certain problem. If this happens, it is better to initialize the cable card by taking out the cable card rather than initializing the device by turning off and on the TV itself. However, since the cable card is installed at the rear side of the device it is not easy for an ordinary user to find and take out the cable card. As such, the initialization of the cable card becomes a difficult task for the users.

The device may also malfunction because a broadcast station sends an incorrect channel list, even temporarily. For instance, if the channel list '100' is not transmitted properly, the user cannot watch the channel 100. When there is an error in the transmission of the channel list, the user cannot erase the incorrect channel list simply by initializing the cable card because this type of error can be corrected only when the station sends a correct channel list. Consequently, the user has no choice but to watch the wrong channel, instead of the original channel 100. Thus, a separate button needs to be provided to erase the incorrect channel list.

SUMMARY OF THE INVENTION

It is an aspect of the present invention to provide an apparatus and method for initializing a cable card using a reset menu on an OSD screen so that a user can initialize the cable card more conveniently, without taking out the cable card from an equipment.

Another aspect of the present invention is to provide an apparatus and method for initializing a channel list using a reset menu on an OSD menu screen so that a user can erase an incorrectly transmitted channel list, without the aid of a separate reset button.

To achieve the above objects and advantages, there is provided a method for initializing a cable card using a reset menu on an OSD (On-Screen Display) screen, in which the method includes: requesting a cable card reset through the reset menu on the OSD screen; and according to the cable card reset request, performing an initialization of the cable card.

In one embodiment of the invention, the receiving the cable card reset request through the reset menu on the OSD screen may include: selecting a menu button on a key input unit and inputting a menu guide list generation signal; according to the menu guide list generation signal, displaying a menu guide list screen having a plurality of predetermined menus; and if a card reset menu for resetting the cable card is selected among the predetermined menus, performing an initialization of the cable card according to a card reset signal being generated.

In an additional exemplary embodiment, the menu guide list screen is the OSD screen.

In an another exemplary embodiment, the cable card is a PCMCIA (Personal Computer Memory Card International Association) card.

In a further exemplary embodiment, the key input unit is either a key matrix or a remote controller.

Another aspect of the present invention provides a method for initializing a channel list using a reset menu on an OSD (On-Screen Display) screen, the method including: requesting a channel list reset through the reset menu on the OSD screen; and according to the channel list reset request, performing an initialization of the channel list.

In an exemplary embodiment, requesting the channel list reset through the reset menu on the OSD screen comprises:

selecting a menu button on a key input unit and inputting a menu guide list generation signal; according to the menu guide list generation signal, displaying a menu guide list screen composed of a plurality of predetermined menus; and if a channel list reset menu for resetting the channel list is selected among the predetermined menus, performing an initialization of the channel list according to a channel list reset signal being generated.

In an exemplary embodiment, the menu guide list screen is the OSD screen.

Additionally, the cable card may be a PCMCIA (Personal Computer Memory Card International Association) card.

In a further exemplary embodiment, the key input unit is either a key matrix or a remote controller.

Another aspect, of the present invention, provides an apparatus for initializing a cable card using a reset menu on an OSD (On-Screen Display) screen, wherein the apparatus includes: an OSD driver for providing the reset menu on the OSD screen; a key input unit for requesting a cable card reset by selecting the reset menu on the OSD screen; and a controller for performing an initialization of the cable card according to the cable card reset request.

The apparatus may also include a monitor for displaying, according to a menu guide list generation signal applied from the key input unit, a menu guide list screen composed of a plurality of predetermined menus.

In an exemplary embodiment, if a cable card reset menu is selected among the predetermined menus the controller receives a card reset signal from the key input unit, and performs the initialization of the cable card.

In another exemplary embodiment, the apparatus is either a digital television set or a set-top box.

Additionally, the key input unit may either be a key matrix or a remote controller.

In a further exemplary embodiment, the cable card is a PCMCIA (Personal Computer Memory Card International Association) card.

BRIEF DESCRIPTION OF THE DRAWINGS

The above and other aspects of the present invention will be more apparent by describing certain embodiments of the present invention with reference to the accompanying drawings, in which.

DETAILED DESCRIPTION OF THE EXEMPLARY EMBODIMENTS

Exemplary embodiments of the present invention will be described herein below with reference to the accompanying drawings.

Figure 1:
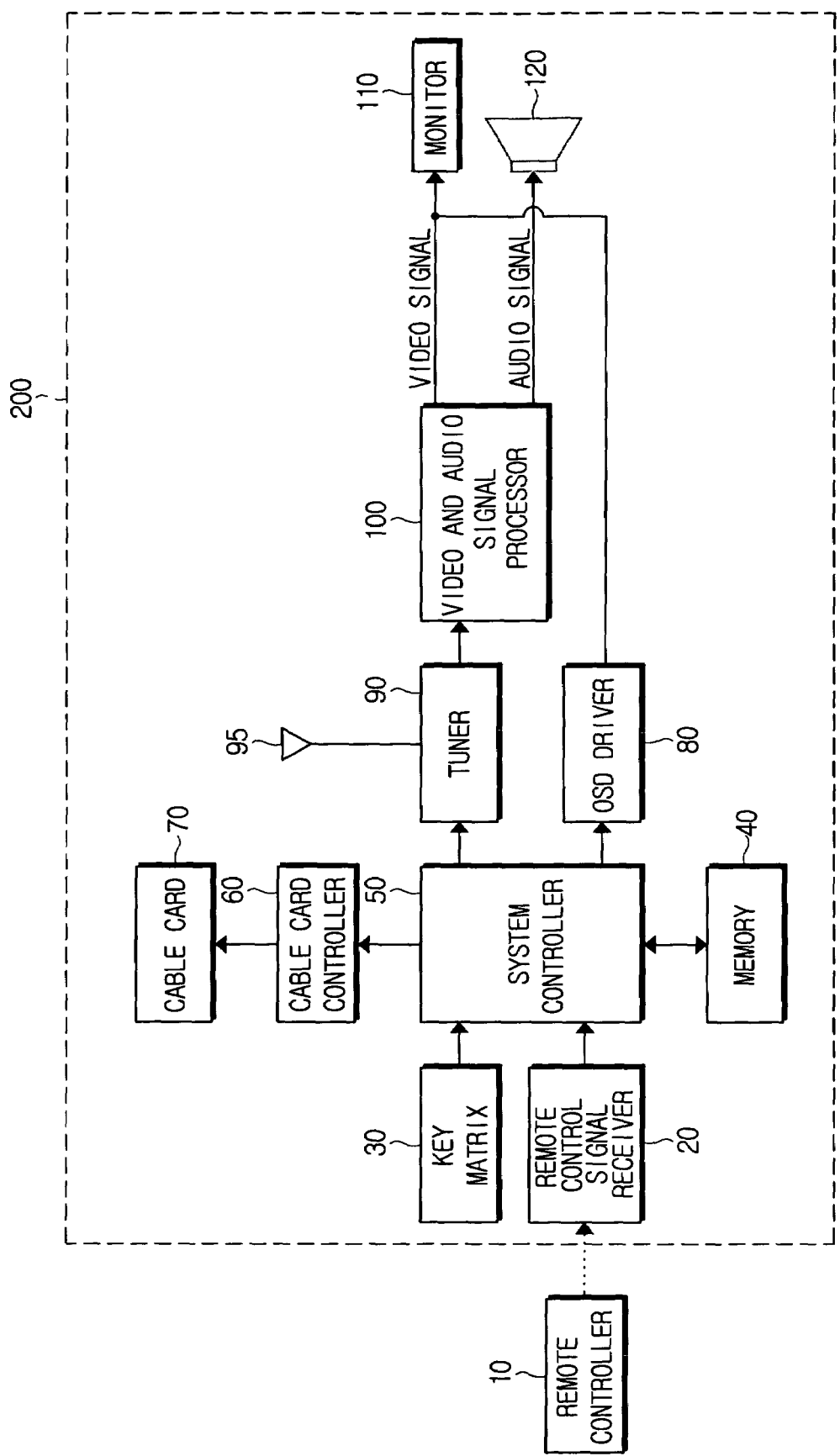
FIG. 1 is a block diagram of a digital TV set for performing the initialization of a cable card and a channel list using a reset menu on an OSD screen according to an exemplary embodiment of the present invention.

FIG. 1 is a block diagram of an apparatus for performing the initialization of a cable card and a channel list using a reset menu on an OSD screen according to an embodiment of the present invention. A digital television set or a set-top box is adopted as the apparatus for performing the initialization of a cable card and a channel list of the present invention. For the purposes of the following discussion, the digital television set will be used.

Referring to FIG. 1, the digital television set 200 includes a remote controller 10 so that a user can control the channel, volume, power on and off, and so forth of the digital television set 200, at a distance. The remote controller 10 includes a plurality of keys. If the user presses a key, a key code corresponding to the key is emitted wirelessly, usually in an infrared beam. The digital television set 200 receives the signal emitted from the remote controller 10, and controls the set 200 with reference to the function indicated by the received key code.

The digital television set 200 includes a remote control signal receiver 20 for receiving a signal transmitted from the remote controller 10, an input unit (such as a key matrix) 30 built in the digital television set 200 itself, a tuner 90 for receiving a signal propagated through an antenna 95, a video and audio signal processor 100 for processing the signal from the tuner 90 and outputting an image signal and an audio signal therefrom. The set 200 also includes a system controller 50 for controlling the digital television set 200, a monitor 110 for displaying the image signal output from the video and audio signal processor 100, a speaker 120 for outputting the audio signal from the video and audio signal processor 100, and a memory 40 for saving all channel information transmitted from outside.

Hereinafter, the video and audio signal processor 100 represents all kinds of devices that process signals transmitted through the tuner 90, and output video and audio signals for use in the monitor 110 and the speaker 120. That is, the video and audio signal processor 100 comes in diverse functions and processing capabilities, depending on the kind of digital television set 200 being used and whether a CRT Cathode Ray Tube (CRT) monitor or a digital screen is used for the monitor 110.

An OSD driver 80, under the control of the system controller 50, receives from the system controller 50 all kinds of OSD data saved in the memory 40, and outputs the OSD data on the screen of the monitor 110. Examples of the OSD data is text or graphic image data. For instance, when the volume control or the on and off reservation is performed through the OSD function, a message formed of text or graphic is output on the screen of the digital television set 200. As the OSD technique is generally well known to one skilled in the art, further description will not be necessary.

The monitor 110 represents all kinds of displays composing the screen according to the kind of the digital television set 200 such as an LCD.

The system controller 50 controls the digital television set 200. As an example, a microprocessor is used as the system controller 50.

In the case of using a microprocessor, there are additional elements required to facilitate the operation of the microprocessor, which include a memory or buffer (not shown) for saving programs or data necessary for the operation of the microprocessor, an OSD device (not shown) for displaying a message on the screen of the monitor 110, and a font ROM (not shown) for storing message fonts for the OSD. With use of the microprocessor as the system controller 50, various control functions can be realized by changing the relevant programs.

The system controller 50 analyzes remote control signals that are received through the remote control signal receiver 20 and input signals from the key matrix 30, and controls the tuner 90, and the video and audio signal processor 100. The video and audio signal processor 100 outputs a video signal and an audio signal, respectively, under the control of the system controller 50. The video signal output from the video and audio signal processor 100 is displayed on the monitor 110, and the audio signal is output through the speaker 120.

When a key operating signal for controlling the cable card 70 is input from the key matrix 30 or the remote controller 10, the system controller 50 provides the signal to the cable card controller 60 so as to control the cable card 70. The cable card may be a Personal Computer Memory Card International Association (PCMCIA) card.

When the cable card 70 is inserted into the digital television set 200, the cable card controller 60 performs bidirectional communication with the cable card 70 to determine whether the cable card 70 and the digital television set 200 are compatible with each other. Then the cable card controller 60 transmits the determination result to the system controller 50, and controls to initialize the cable card 70 according to a card reset signal applied from the system controller 50.

The memory 40 saves all kinds of channel information, for example, a channel list, transmitted from a station (not shown) through the cable card 70.

Figure 2:
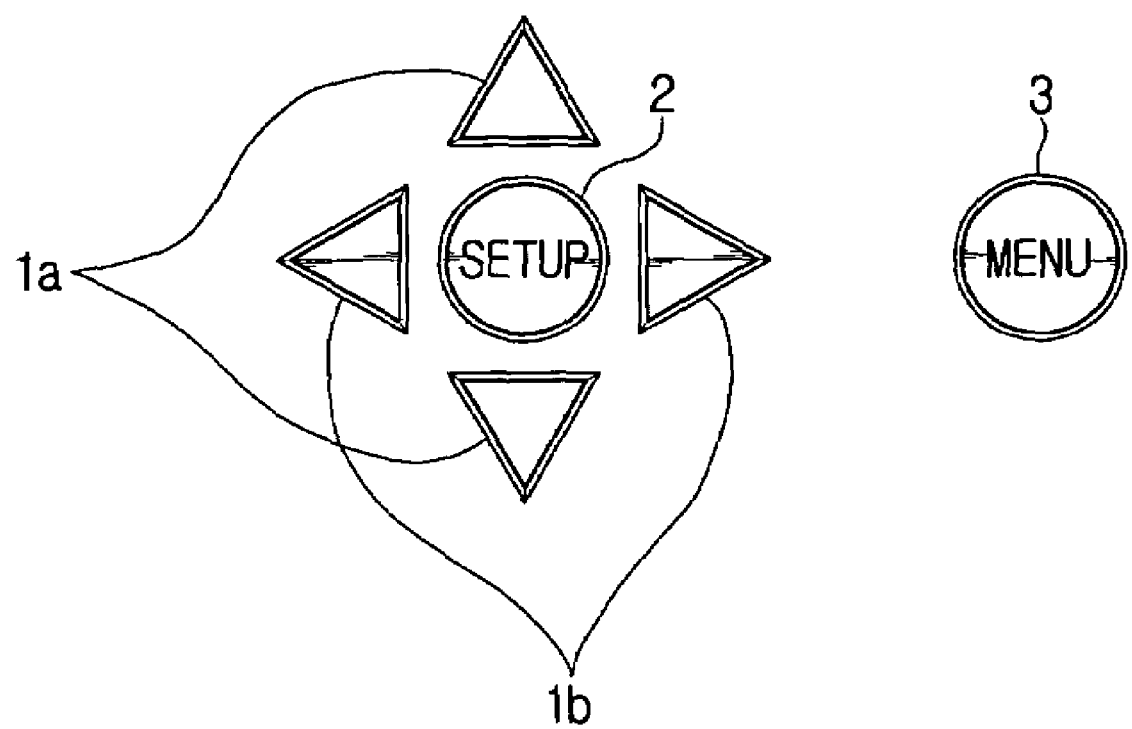
FIG. 2 illustrates a key matrix or buttons on a remote controller as shown in FIG. 1.

FIG. 2 illustrates an exemplary embodiment of a key matrix or buttons on the remote controller 10, as shown in FIG. 1. Referring to FIG. 2, the key matrix 30 or the remote controller 10 includes four direction buttons 1a and 1b, a menu button 3, and a setup button 2, and controls the test pattern through the OSD.

If the user operates the key matrix 30 or the remote controller 10 to display a specific menu screen, the OSD data saved in the memory 40 is displayed on the monitor 110 through the system controller 50 and the OSD driver 80.

Figure 3:
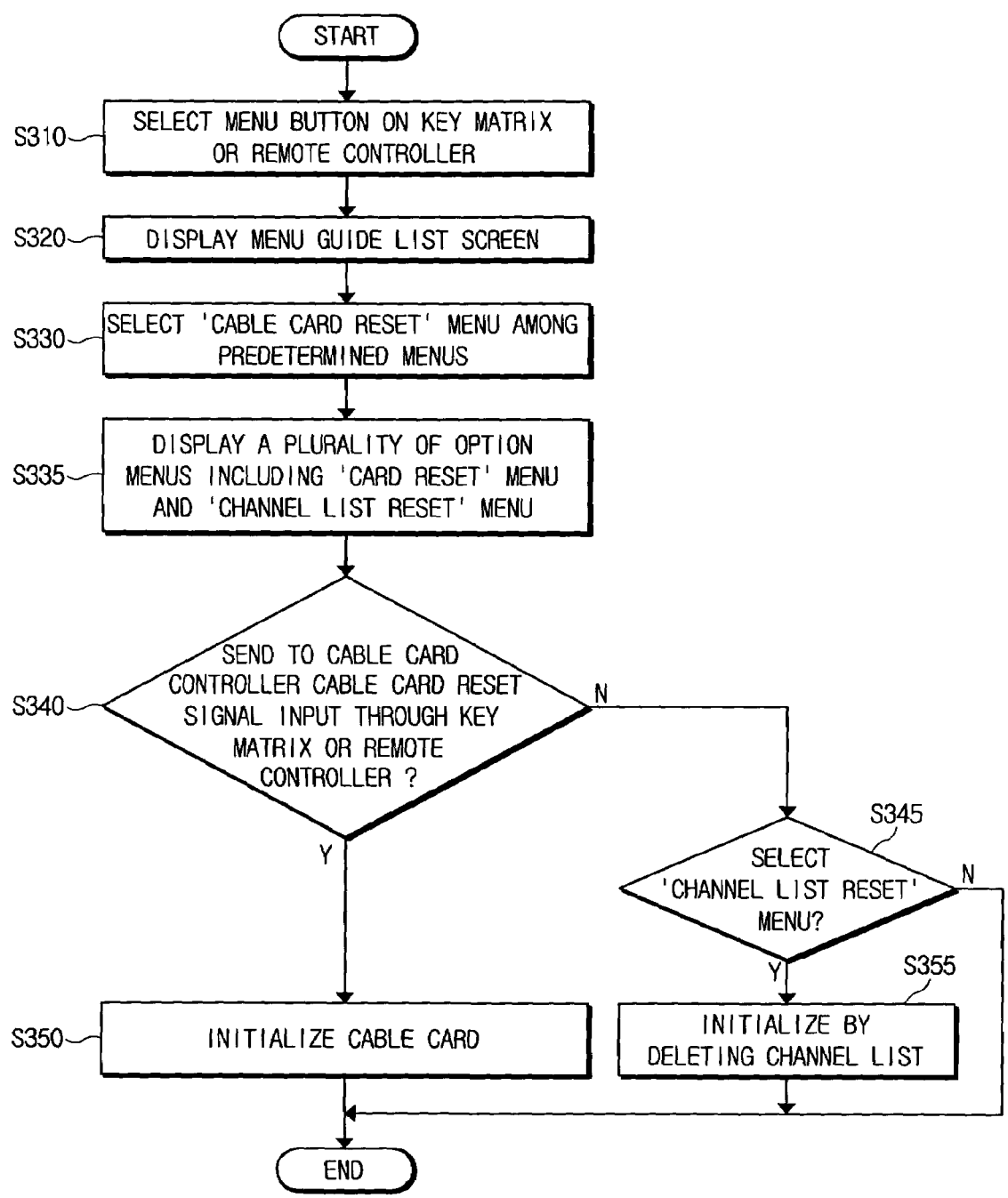
FIG. 3 is a flow chart for explaining a method for initializing a cable card and a channel list using a reset menu on an OSD screen according to an exemplary embodiment of the present invention.

FIG. 3 is a flow chart for explaining a method for initializing the cable card and the channel list using a reset menu on the OSD screen according to an exemplary embodiment of the present invention. If a malfunction occurs in the equipment because the cable card and the television set are not compatible with each other, the user tries to initialize the cable card using the cable card reset menu on the OSD screen.

Still referring to FIG. 3, the user selects the menu button 3 laid out on the key matrix 30 or the remote controller 10 (S310). Once the menu button 3 is selected, a menu guide list generation signal is applied to the system controller 50, and the system controller 50 provides the menu guide list data, which is the OSD data saved in the memory 40, to the OSD driver 80. The OSD driver 80 generates the menu guide list screen which is the OSD screen, and displays it on the monitor 110 (S320).

Figure 4:
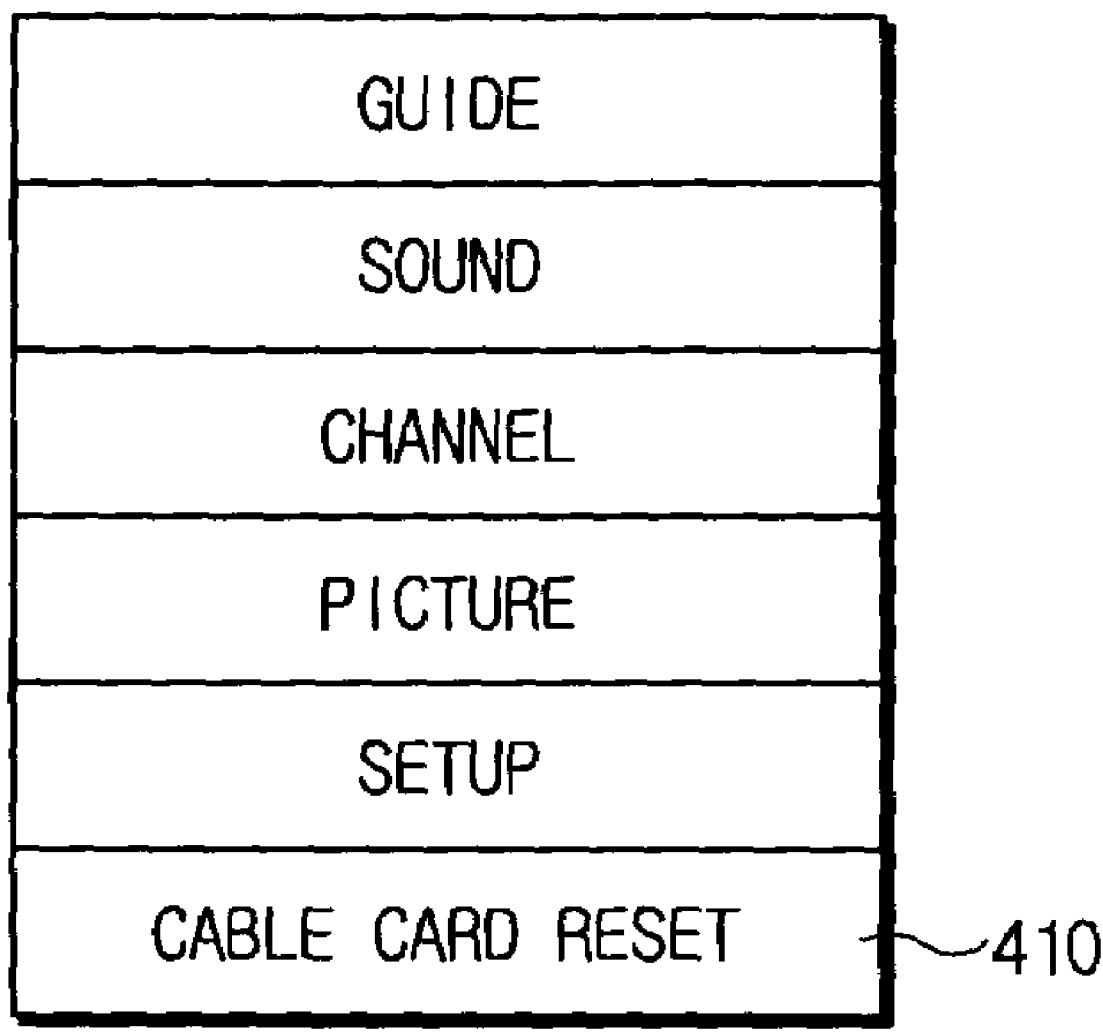
FIG. 4 illustrates an initial menu guide list that is displayed on a monitor when a user presses a menu button.

FIG. 4 illustrates an exemplary initial menu guide list that is displayed on the monitor if the user presses the menu button 3. By pressing the up/down direction buttons 1a on the key matrix 30 or the remote controller 10, the user moves a cursor to a cable card reset menu 410 among the menus displayed on the menu guide list screen 400, and presses the setup button 2 to select the cable card reset menu 410 (S330).

When the cable card reset menu 410 is selected by the user, a plurality of option menus (not shown) including a card reset menu and a channel list reset menu are displayed on the monitor (S335).

If the user selects the card reset menu among the option menus (S340), a signal is applied from the key matrix 30 or the remote controller 10 to the system controller 50, and the system controller 50 provides a card reset signal to the cable card controller 60. Upon receiving the card reset signal from the system controller 50, the cable card controller 60 performs the initialization of the cable card 70 (S350). In result, the cable card 70 is initialized as it was first inserted into the digital television set 200.

If the user selects the channel list reset menu among the option menus (S345), a signal is applied from the key matrix 30 or the remote controller 10 to the system controller 50, and the system controller 50 deletes the channel list from the memory 40 according to a channel list reset signal, and performs the initialization of the channel list (S355).

As described above, if a malfunction occurs in the equipment, the user can initialize the cable card simply by pressing the reset menu on the OSD menu screen. Therefore, the user does not have to take out the cable card for the initialization any more.

Further, the user can easily initialize an incorrectly transmitted channel list by pressing the reset menu on the OSD screen, and receive a new errorless channel list. In this manner, it is possible to prevent the malfunction of the equipment caused by the channel list with an error.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A method for initializing a cable card and a channel list, the method comprising:
    initializing the cable card and the channel list;
    selecting a menu button on a key input unit and inputting a menu guide list generation signal; and
    displaying a menu guide list screen composed of a plurality of predetermined menus;
    requesting a cable card re-initialization or a channel list re-initialization in accordance with a user input; and
    re-initializing the cable card or the channel list without reinsertion or on/off operation according to the cable card re-initialization request or the channel list re-initialization request,
    wherein the re-initializing the cable card comprises re-initializing the cable card according to a card re-initialization signal being generated if a menu for re-initializing the cable card is selected among the predetermined menus, and
    wherein the re-initializing the channel list comprises re-initializing the channel list according to a channel list re-initialization signal being generated if a menu for re-initializing the channel list is selected among the predetermined menus.

2. The method according to claim 1, wherein the menu guide list screen is an on-screen display screen.

3. The method according to claim 1, wherein the cable card is a Personal Computer Memory Card International Association card.

4. The method according to claim 1, wherein the key input unit is one of a key matrix and a remote controller.

5. The method according to claim 1, wherein the cable card is reset during the re-initializing of the cable card.

6. The method according to claim 1, wherein an existing stored channel list is deleted after the requesting of the channel list.

7. The method according to claim 1, wherein the channel list is reset during the re-initializing of the channel list.

8. An apparatus for initializing a cable card and a channel list, the apparatus comprising:

a controller which initializes the cable card and the channel list;

a key input unit which requests a cable card re-initialization or a channel list re-initialization in accordance with a user input; and a monitor which displays, according to a menu guide list generation signal applied from the key input unit, a menu guide list screen composed of a plurality of predetermined menus;

wherein the controller which re-initializes the cable card or the channel list without reinsertion or on/off operation according to the cable card re-initialization request or the channel list re-initialization request, wherein, if a cable card re-initialization menu is selected among the predetermined menus, the controller receives a signal from the key input unit and re-initializes the cable card, and wherein, if a channel list re-initialization menu is selected among the predetermined menus, the controller receives a signal from the key input unit and re-initializes the channel list.

9. The apparatus according to claim 8, wherein the apparatus is one of a digital television set and a set-top box.

10. The apparatus according to claim 8, wherein the key input unit is one of a key matrix and a remote controller.

11. The apparatus according to claim 8, wherein the cable card is a Personal Computer Memory Card International Association card.

12. The apparatus according to claim 8, wherein the cable card is reset by the controller according to the cable card re-initialization request.

13. The apparatus according to claim 8, wherein the channel list is reset by the controller according to the channel list reset request.

14. The apparatus according to claim 8, further comprising a memory which stores an existing channel list, wherein said existing channel list is deleted in response to channel list reset request.

* * * * *

UNITED STATES PATENT AND TRADEMARK OFFICE
CERTIFICATE OF CORRECTION

PATENT NO.      : 7,661,122 B2                                        Page 1 of 1
APPLICATION NO. : 11/195797
DATED           : February 9, 2010
INVENTOR(S)     : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 874 days.

Signed and Sealed this

Twenty-eighth Day of December, 2010

David J. Kappos
*Director of the United States Patent and Trademark Office*